(12) United States Patent
Sanchez Gomez

(10) Patent No.: US 6,651,434 B2
(45) Date of Patent: Nov. 25, 2003

(54) SYSTEM OF SOLAR AND GRAVITATIONAL ENERGY

(76) Inventor: Gines Sanchez Gomez, Calle Cervantes, 1, 7, B, Mostoles (Madrid) (ES), 28932

( * ) Notice: Subject to any disclaimer, the term of this patent is extended or adjusted under 35 U.S.C. 154(b) by 0 days.

(21) Appl. No.: 09/945,129

(22) Filed: Aug. 27, 2001

(65) Prior Publication Data

US 2002/0023439 A1 Feb. 28, 2002

(51) Int. Cl.[7] .................................................. F03G 6/00
(52) U.S. Cl. ...................... 60/641.11; 60/641.8; 60/675
(58) Field of Search ...................... 60/641.2, 641.8, 60/641.11, 675

(56) References Cited

U.S. PATENT DOCUMENTS

| | | | | |
|---|---|---|---|---|
| 3,827,901 A | * | 8/1974 | Griffin | 106/467 |
| 3,953,971 A | * | 5/1976 | Parker | 60/641 |
| 4,091,623 A | * | 5/1978 | Edmondson et al. | 203/100 |
| 4,156,401 A | * | 5/1979 | Ogui | 119/259 |
| 4,244,189 A | * | 1/1981 | Bliamptis | 60/641 |
| 4,255,933 A | * | 3/1981 | Bailey et al. | 60/675 X |
| 4,280,328 A | * | 7/1981 | Falconer | 60/641 |
| 4,382,365 A | * | 5/1983 | Kira et al. | 60/675 |
| 4,450,689 A | * | 5/1984 | Moe | 60/641.7 |

* cited by examiner

Primary Examiner—Hoang Nguyen

(57) ABSTRACT

A liquid is evaporated by the sun, raised as vapor, condensed and stored in tanks. These tanks are connected to a turbine. Turbine is feed by the condensed liquid, and then the liquid is evaporated again.

The system is closed and the liquid has an intermediate boiling point between ambient temperature in sun areas (South) and ambient temperature in shade areas (North).

1 Claim, 2 Drawing Sheets

SYSTEM OF SOLAR AND GRAVITATIONAL ENERGY

CROSS-REFERENCE TO RELATED APPLICATIONS

The present invention is based on the Spanish application of patent n° P200002166, dated Aug. 30, 2000, that is priority.

Following patents are related with the present invention:

U.S. Pat. No. 3,953,971. System for generating power utilizing the elevation differences and available temperatures on the earth's surface, such as occurs in a mountainous region with a nearby valley or desert.

U.S. Pat. No. 4,280,328. Solar energy is utilized to convert water into steam for use in driving a turbine.

U.S. Pat. No. 4,244,189. A solar energy system where the incident solar radiation evaporates a quantity of water in a distillation pond.

In the three patent, a liquid is evaporates, rised to a high level, condensed, and stored as liquid.

BACKGROUND OF THE INVENTION

Hydroelectric energy, that transforms the potential energy of water between two levels of a river in kinetic energy and electricity, it is solar and gravitational energy, because the energy that elevates the water is from the sum, through its evaporation, condensation and precipitation in rain or snow.

BRIEF SUMMARY OF THE INVENTION

The natural process of the previous paragraph is capable of being imitated.

It takes advantage from temperature differences between sun areas and shade areas, evaporating, rising and condensing a liquid with intermediate boiling point between the temperature in sun areas and shade areas.

This system is closed and it has devices to control the boiling point, as an internal expansion chamber with adjustable walls or a suction pump.

An advantage of this system is the possibility to store the collected solar energy in gravitational potential energy of the evaporated and condensed liquid.

Figure 1:
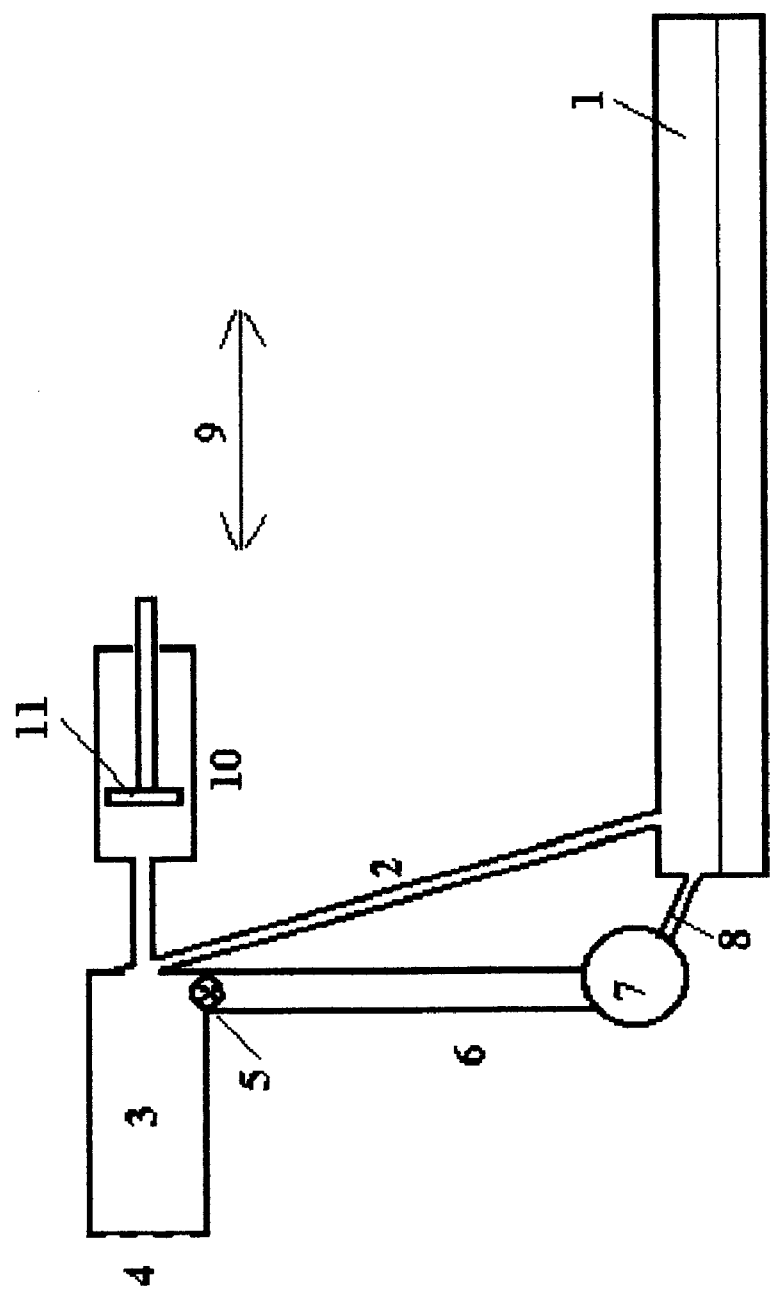
FIG. 1. General scheme.

The simbols 10 and 11 of the FIG. 1 only are by clarity purposes, by this, said simbols are not part of the invention

DETAILED DESCRIPTION OF THE INVENTION

It is schematized in FIG. 1.

It is the evaporation reservoir (1), the vapor conduit (2), the condensation tank (3) in high level, the heat radiator (4) located in the shade, the regulation valve (5), the conduit (6) that connects the tank (3) with a turbine—generator (7) and finally the turbine drainage channel (8) that returns the liquid to the evaporation reservoir (1).

With the reference (9) an orientation North-South is represented, where North is a sun area and South is a shade area.

The system is closed, containing a liquid whose boiling point is intermediate between the sun area temperature and the shade area temperature. Obviously, the system also contains the vapor of referenced liquid. The refrigerating liquids can complete these requirements to average ambient temperature. The system is thermally isolated, excepting the heating (1) and cooling (4) areas.

To adjust the boiling point to the ambient temperature of each moment, the pressure of the system is varied. The pressure is varied with an expansion chamber (10) with one of its walls being mobile (11).

Operating is as following: sun warms and evaporates the liquid of reservoir (1). The vapor, by be hot itself and by diffusion it rises until the condensation tank (3) through the vapor conduit (2), where it is condensed for exchange of its heat through radiator (4) which are located in shade. The liquid is stored in the tank (3). Utilitation of tank liquid is the traditional of a hydroelectric power system, feeding from high the turbine (7).

The evaporation reservoir is designed so that it receives the most possible energy. An appropriate design for reception of solar energy is schematized in the FIG. 2 that it shows a section of the reservoir. It is a glass or plastic trasparente cover (2) with low reflection index (2) over the whole reservoir (1). The walls of said reservoir are a interior copper coat or material of high solar absorption constant (3), and another external coat thermally insulating (4).

Figure 2:
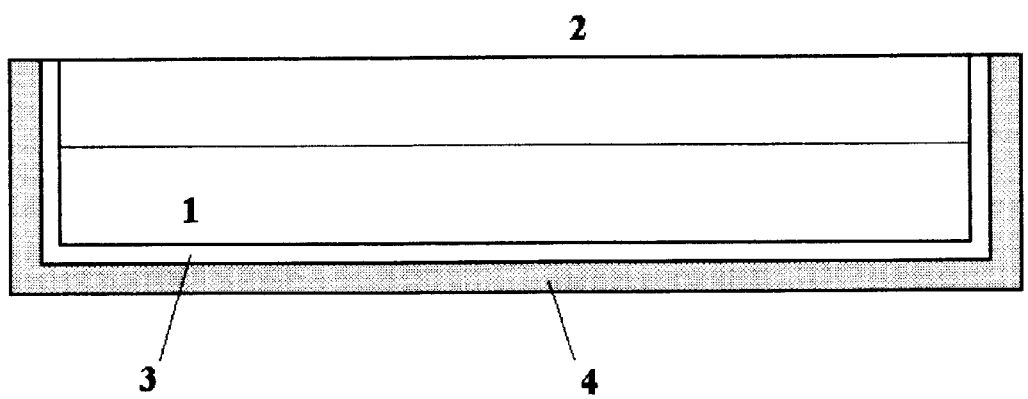
FIG. 2. Section of an evaporation reservoir.
Figure 3:
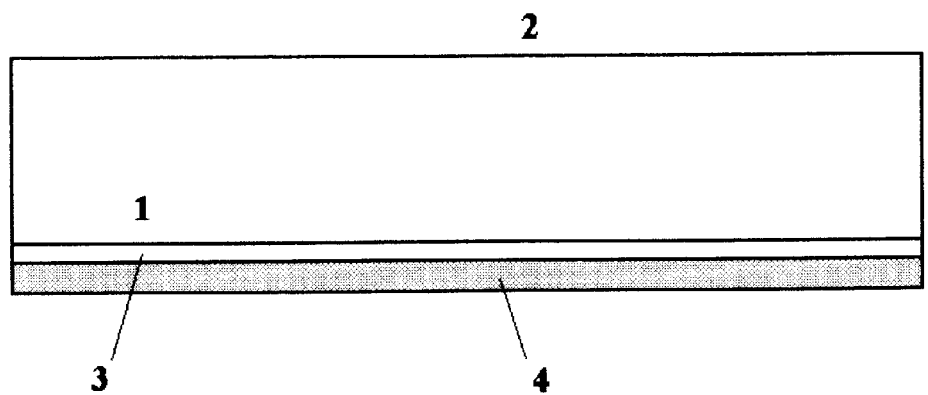
FIG. 3. Section of a vapor conduit.

The vapor conduit for reception of solar energy is schematized in the FIG. 3, similar to FIG. 2, having the reference numbers the same meaning. This conduit is in the sun for maintain the vapor temperature the highest possible.

I claim:

1. A device for reception and storage of solar energy as gravitational potential energy of a liquid, that is evaporated in a sun area, the vapor is rised to a high level, being condensed in a shade area, stored as liquid and used in a conventional way as hydroelectric energy, comprising an evaporation reservoir located in the sun area having a cover of transparent plastic or a glass with low reflection index, walls and floor with an internal coal of copper or material with high solar absorption and an external coat thermally insulating, a vapor conduit located in the sun area from the reservoir to the shade area having the cover of transparent plastic or the glass with low reflection index, the floor with the internal coat of copper or material with high solar absorption, and the external coat thermally insulating.

* * * * *